United States Patent
Passarotto et al.

(10) Patent No.: US 7,354,114 B2
(45) Date of Patent: Apr. 8, 2008

(54) SPOKE FOR A BICYCLE WHEEL, BICYCLE WHEEL COMPRISING SUCH A SPOKE AND METHOD FOR MANUFACTURING SUCH A SPOKE

(75) Inventors: Maurizio Passarotto, Rovigo (IT); Mario Meggiolan, Creazzo (IT)

(73) Assignee: Campagnolo, S.r.l., Vicenza (IT)

( * ) Notice: Subject to any disclaimer, the term of this patent is extended or adjusted under 35 U.S.C. 154(b) by 211 days.

(21) Appl. No.: 11/044,234

(22) Filed: Jan. 27, 2005

(65) Prior Publication Data
US 2005/0161998 A1    Jul. 28, 2005

(30) Foreign Application Priority Data
Jan. 27, 2004   (EP)   ................... 04425046

(51) Int. Cl.
*B60B 1/00* (2006.01)
*B60B 1/04* (2006.01)
(52) U.S. Cl. ........................ 301/104; 301/59
(58) Field of Classification Search ............... 301/55, 301/56, 58, 59, 61, 104, 110.5
See application file for complete search history.

(56) References Cited

U.S. PATENT DOCUMENTS

| | | | |
|---|---|---|---|
| 598,620 A * | 2/1898 | Allen | 301/104 |
| 748,684 A * | 1/1904 | Anderson et al. | 301/58 |
| 1,222,094 A * | 4/1917 | Frommann | 301/58 |
| 3,894,777 A | 7/1975 | Yamada | |
| 5,626,401 A * | 5/1997 | Terry et al. | 301/59 |
| 6,036,279 A | 3/2000 | Campagnolo | |
| 6,189,978 B1 | 2/2001 | Lacombe et al. | |
| 7,077,480 B2 * | 7/2006 | Hjertberg et al. | 301/58 |
| 2001/0054840 A1 | 12/2001 | Schlanger | |
| 2003/0062763 A1* | 4/2003 | Dietrich | 301/104 |
| 2005/0173971 A1* | 8/2005 | Passarotto et al. | 301/104 |
| 2006/0006730 A1* | 1/2006 | Meggiolan | 301/59 |
| 2006/0170277 A1* | 8/2006 | Passarotto et al. | 301/59 |

FOREIGN PATENT DOCUMENTS

| | | |
|---|---|---|
| EP | 0 794 071 A2 | 9/1997 |
| FR | 2 707 559 A1 | 1/1995 |
| GB | 1 557 342 | 12/1979 |

* cited by examiner

*Primary Examiner*—Russell D. Stormer
(74) *Attorney, Agent, or Firm*—Volpe and Koenig, PC

(57) ABSTRACT

A spoke for a bicycle wheel has an elongated metallic material body that extends along a longitudinal axis X-X and has a first end portion for the attachment to a hub of a bicycle wheel, a second end portion for the attachment to a rim of a bicycle wheel and an intermediate portion having a portion which is flattened in a transversal direction Z perpendicular to the longitudinal axis X-X and extending along the longitudinal axis X-X up to the first end portion. The first end portion of the spoke is also flattened in the transversal direction Z and is gradually joined to the flattened portion of the intermediate portion along the longitudinal axis X-X.

26 Claims, 5 Drawing Sheets

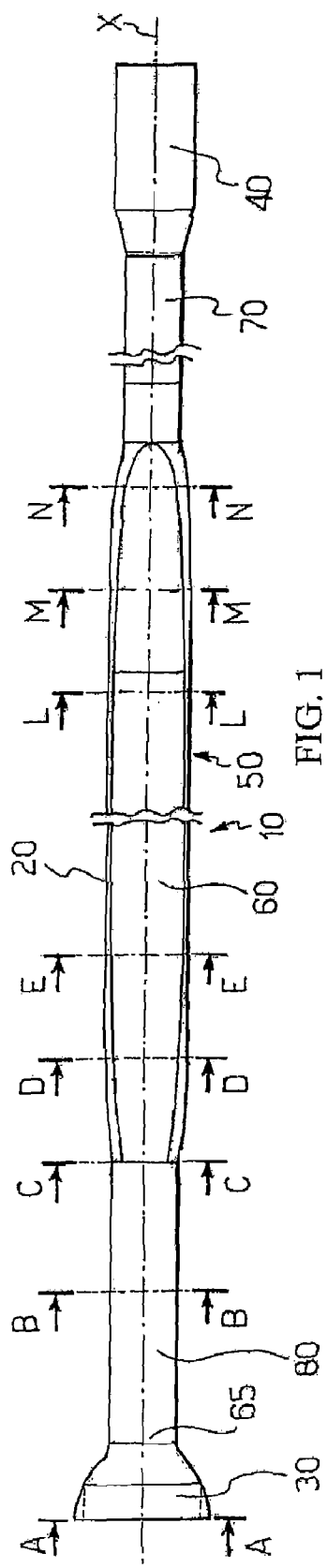
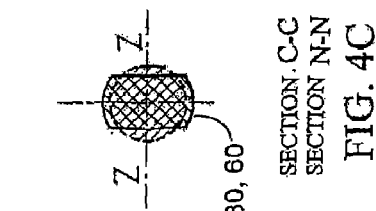
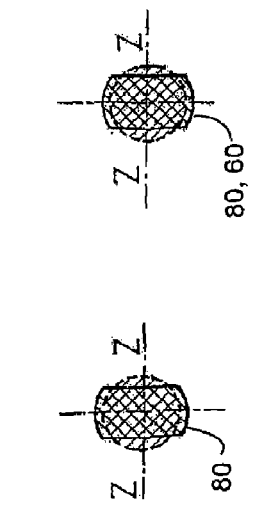
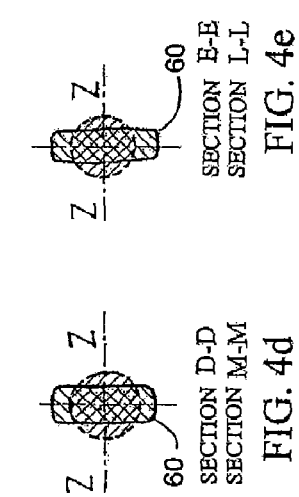
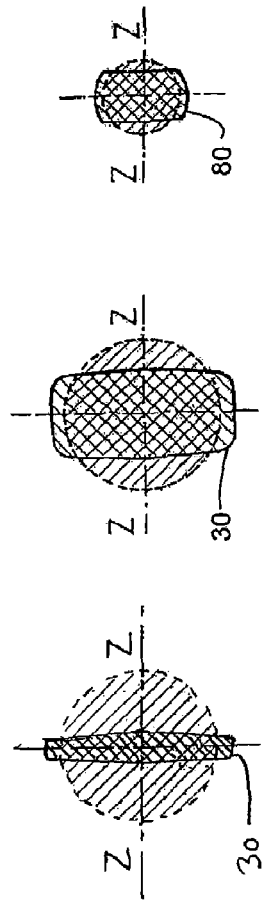
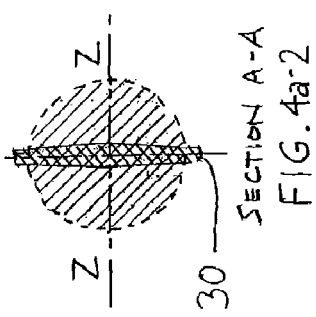
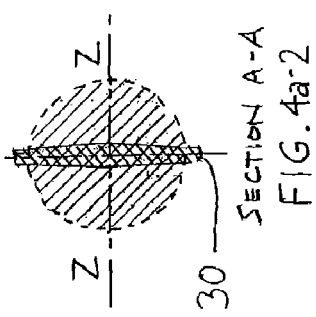

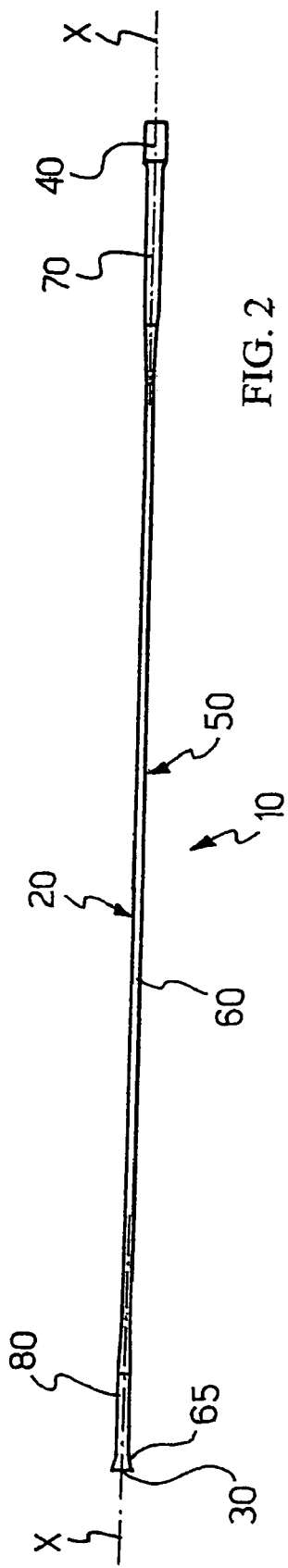
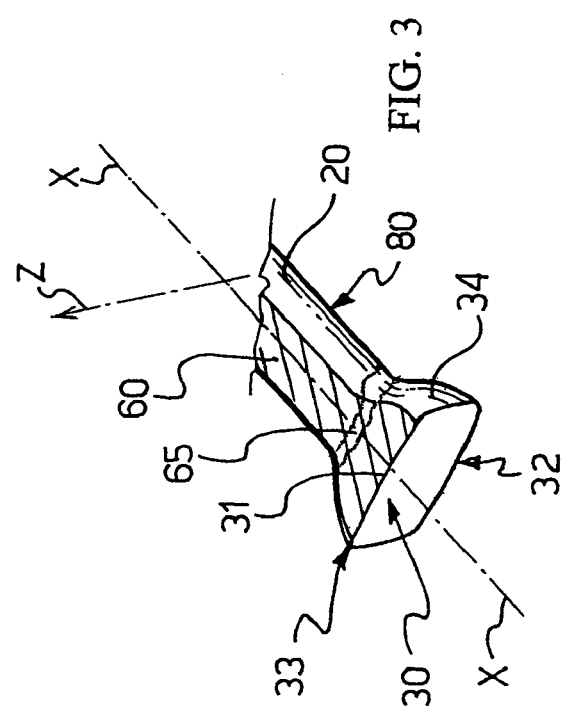

SPOKE FOR A BICYCLE WHEEL, BICYCLE WHEEL COMPRISING SUCH A SPOKE AND METHOD FOR MANUFACTURING SUCH A SPOKE

FIELD OF INVENTION

The present invention relates to a spoke for a bicycle wheel. More specifically, the invention relates to a spoke for a bicycle wheel made of metallic material, a bicycle wheel comprising a plurality of such spokes, and a method for manufacturing such a spoke.

BACKGROUND

As known, the spokes for a bicycle wheel consist of substantially wire-shaped elements, generally made of metal like steel or aluminum or alloys thereof, provided with a first end portion for the attachment to the central part of the wheel consisting of the hub and a second end portion for the attachment to the rim on which the tire is mounted. Typically, the end portion for attachment to the hub is shaped so as to define a widened head intended to be stably housed in suitable seats formed in the hub. The end portion for attachment to the rim has a threaded zone to allow fastening to the rim and adjustment of the tension of the spoke using a suitable nut or nipple.

In order to enhance the aesthetics and the aerodynamic characteristics of the wheels, flattened spokes have been proposed, i.e. spokes in which the body portion between the two end portions for the attachment to the hub and to the rim is flattened.

SUMMARY

The object of the present invention is that of providing a flattened metal spoke which, as well as aesthetically distinguishing itself from those of the prior art, is suitable for being connected to the hub at the front surface thereof (thus simplifying the manufacturing of the hub), without, at the same time, having the drawbacks of the flattened spokes of the prior art made of metallic material.

The present invention, therefore, relates, in a first aspect thereof, to a spoke for a bicycle wheel, comprising an elongated body made of metallic material extending along a longitudinal axis X-X and having:

a first end portion for attachment to a hub of a bicycle wheel;

a second end portion for attachment to a rim of a bicycle wheel;

an intermediate portion between said first and second end portions, in which said intermediate portion comprises a portion which is flattened in a transversal direction Z perpendicular to said longitudinal axis X-X and extending along said longitudinal axis X-X up to said first end portion;

wherein said first end portion is flattened in said transversal direction Z and is gradually joined to said flattened portion of said intermediate portion along said longitudinal axis X-X.

BRIEF DESCRIPTION OF THE DRAWING(S)

Further characteristics and advantages of the present invention shall become clearer from the following detailed description of a preferred embodiment thereof, given with reference to the attached drawings. In such drawings, FIG. 1 is an enlarged schematic front view of a spoke for a bicycle wheel according to the present invention;

FIG. 2 is a schematic side view of the spoke of FIG. 1;

FIG. 3 is an enlarged schematic perspective view of an end portion of the spoke of FIG. 1;

FIGS. 4a-4d represent different cross sections of the spoke of FIG. 1 taken at the different section lines shown in FIG. 1, for each section the equivalent circle also being represented, the area of which is equal to the area of the section in question;

DETAILED DESCRIPTION OF THE PREFERRED EMBODIMENT(S)

Introduction to the Embodiments

Figure 5:
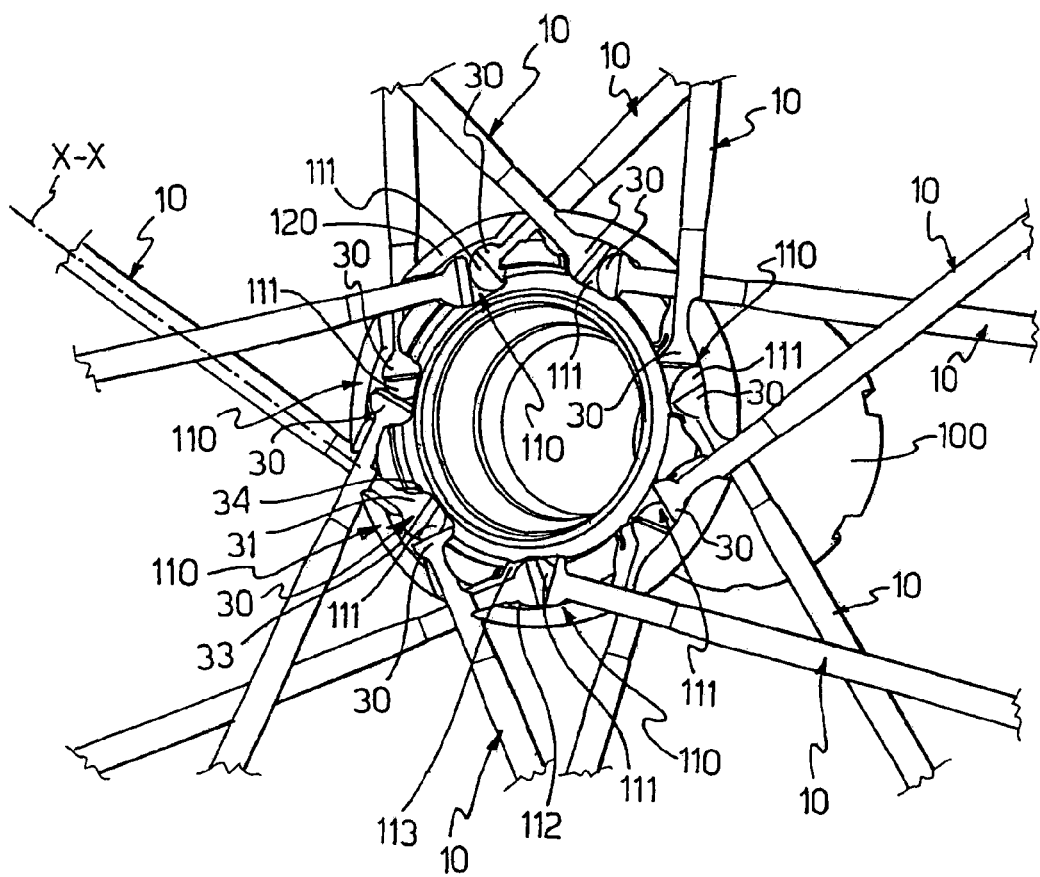
FIG. 5 is a schematic perspective view, from a first point of view, of a central portion of the wheel of the present invention in a first embodiment thereof.

Carbon-reinforced flattened spokes are advantageous because they are lightweight. The use of such a material, however, requires the need to make the spoke in two distinct elements: a first elongated and flattened carbon fiber element in which the head for the attachment to the hub is defined, and a second metallic connection element hinged to a free end of the carbon fiber element and provided with a threading to allow the attachment to the rim and the tensioning of the spoke.

The Applicant has noted that prior art spokes discussed above have some drawbacks. In particular, the need to manufacture the spoke in two distinct elements is technically complicated, and consequently involves high production costs. Further, due to the necessary size of the spoke at the hub, spokes made of uniform thickness are heavy along their entire length, even though certain portions of the spoke do not require a uniform thickness.

This means, as well as inevitable technical complications in the manufacturing of the head for the attachment to the hub, that a heavy spoke is obtained, due to the substantial size of the head for the attachment to the hub. Moreover, the substantial change in section at the passage zone between the intermediate portion of the spoke and the head for the attachment to the hub defines a critically important zone with a high concentration of tension at the passage zone, due to 1) the transmission of the driving torque between hub and spoke, and 2) because in such a zone the same traction stresses are amplified by local effects linked to the attachment to the hub.

The Applicant has therefore focused above all upon the design and manufacture of a flattened spoke made of metal material (flattened metal spokes being generally known), so as to be able to make the spoke in a single body.

Throughout the present description and the subsequent claims, the expression "flattened portion", used with reference to the intermediate portion or to the first end portion of the spoke of the present invention, is used to indicate a portion that has been squashed along the transversal direction Z so that the cross section of such a portion has one dimension (typically defining the thickness of the spoke portion in question) substantially smaller than the other dimension (typically defining the width of the spoke portion in question). For example, a spoke portion is flattened when the thickness (or generically a dimension of the cross section) of the spoke portion in question is less than 1.5 times the width (or generically the other dimension of the cross section) of the spoke portion in question. Therefore, the opposite faces of said spoke portion do not necessarily have to be perfectly flat and parallel; i.e. it is also possible for such faces to have a substantially elliptical progression or a substantially circular progression with a wide radius of curvature.

Advantageously, the spoke of the present invention, as well as having aerodynamic characteristics and pleasant aesthetics typical of flattened spokes, also has a body that is flattened both at the intermediate portion of the elongated element constituting the body of the spoke and at the first end portion constituting the head for the attachment to the hub, with the latter gradually joined to the flattened intermediate portion of the spoke. Such a spoke therefore has an aesthetic look which is different from that of the metallic spokes disclosed in the patents of the prior art. Moreover, the spoke of the present invention is particularly suitable for being associated with the hub at the front surface thereof; indeed, the provision of a head for the attachment to the hub that is flattened in the transversal direction Z ensures a stable housing of such a head in the hub. Even more advantageously, the flattened head, as well as contributing to the manufacturing of a spoke having a lower overall weight with respect to those of the prior art, prevents the rotation of the spoke about its longitudinal axis during tensioning. The spoke of the invention also has characteristics of resistance to the transfer of the driving torque exerted by the hub better than those spokes discussed above; this is due to the fact that it has a head for the attachment to the hub that is flattened and gradually joined to the flattened intermediate portion of the spoke.

Throughout the present description and the subsequent claims, the term "profile", used with reference to the cross section of any portion of the spoke of the present invention, is used to indicate the shape defined by the outline of such a cross section. The expression "substantially the same profile", used with reference to the sections of the spoke of the present invention, is thus used to indicate that such sections have a substantially identical shape, and not necessarily also a substantially identical area. The expression "substantially the same", used with reference to the profiles of the sections of the spoke of the present invention, also embraces the possibility of small differences in the profiles, for example due to joins, or bevels or tapers. Further, for example, in the context of this application, a rectangular profile is substantially the same as the profile shown in FIGS. 4a through 4e with opposite faces that are rounded (not necessarily flat) and/or gradually joined at their corners although in alternate embodiments, the profile could include sharp corners.

Description of the Embodiments

In the attached Figures, a spoke for bicycle wheels is indicated with reference numeral 10. The spoke 10 comprises an elongated body 20 of metallic material like steel or aluminum or alloys thereof (preferably aluminum alloy) extending along a longitudinal axis X-X. Such a type of spoke is intended to be used in a bicycle wheel to connect a hub 100 (illustrated in Figures from 5 to 7) to a rim (not illustrated).

The body 20 of the spoke 10 comprises a first end portion 30 defining a head for the attachment to the hub, a second threaded end portion 40 defining a zone for the attachment to the rim and an intermediate portion 50. Such an intermediate portion 50 in turn comprises a portion 60 which is flattened in a transversal direction Z perpendicular to the longitudinal axis X-X of the spoke 10 and extending along said longitudinal axis X-X up to the head 30 for the attachment to the hub; on the opposite side, the intermediate portion 50 comprises a cylindrical portion 70 extending along the longitudinal axis X-X up to the head 40 for the attachment to the rim.

The head 30 for the attachment to the hub is also flattened in the transversal direction Z and is gradually joined, along the longitudinal axis X-X of the intermediate portion 50, to the flattened portion 60 of the elongated body 20 through a joining zone 65 (visible in detail in FIG. 3).

As better illustrated in FIGS. 4a-4e, the elongated body 20 has, along the longitudinal axis X-X, cross sections having substantially the same profiles (or else shapes), i.e. sections all being substantially rectangular, elliptical or circular in shape with a wide radium of curvature, with squashed—not necessarily flat—and/or gradually joined opposite faces. The broken line in FIGS. 4a-4e indicates the circle that defines an equivalent area of the spoke with the flattened profile. The equivalent area represents, for each section, the area of a hypothetical non-flattened cylindrical wire which has, in each section, the same area as the spoke with a flattened profile. In particular, the head 30 for the attachment to the hub has a cross section having substantially the same profile as the cross section of the flattened portion 60 of the intermediate portion 50 of the elongated body 20 at a zone 80 thereof adjacent to the head 30 for the attachment to the hub (FIGS. 4a and 4b).

Advantageously, a gradual passage from the flattened intermediate portion of the spoke to the head for the attachment to the hub is obtained.

While having substantially the same profiles, the cross sections of the flattened portion 60 of the intermediate portion 50 of the elongated body 20 have a different area, starting from the section A-A at the head 30 for the attachment to the hub up to near the section N-N close to the cylindrical portion 70 adjacent to the head 40 for the attachment to the rim. In particular, the flattened portion 60 of the intermediate portion 50 of the elongated body 20 has, along the longitudinal axis X-X, cross sections of increasing area towards the zone 80 adjacent to the head 30 for the attachment to the hub and towards the cylindrical portion 70 adjacent to the head 40 for the attachment to the rim. The spoke of the invention thus has a small amount of material (less cross-sectional area) in its central zone, whereas it is more solid (greater cross-sectional area) near to the heads for the attachment to the hub and to the rim, while still keeping, along the entire length for which it extends, substantially the same profile of the cross sections. This advantageously allows the overall weight of the spoke of the present invention to be reduced with respect to known spokes having cross sections of constant area for the entire length on which they extend.

In different embodiments, the flattened portion 60 of said intermediate portion 50 may have, along its longitudinal axis X-X, cross sections of different area.

As best seen in FIG. 3, the head 30 for the attachment to the hub comprises a pair of opposite front surfaces 31, 32, respectively front and rear, that are substantially flat; such surfaces 31 and 32 extend along the longitudinal axis X-X of the spoke for a portion of length that is greater than the dimension of the head 30 in the transversal direction Z. One of the front surfaces 31, 32, in the attached Figures the surface 32, defines a front abutment surface of the head 30 on the hub 100 of the bicycle wheel when the spoke 10 is mounted on the hub, as shall be better described hereafter with reference to FIGS. 5-7. The surfaces 31 and 32 are slightly flared outwards, so that the head 30 is, in the transversal direction Z, greater in thickness than the thickness of the flattened portion 60. Such surfaces could also be substantially straight or narrow inwards, so that the head 30 has substantially the same (FIG. 4*a*-1) or smaller thickness FIG. 4*a*-2) with respect to the thickness of the flattened portion 60.

Figure 6:
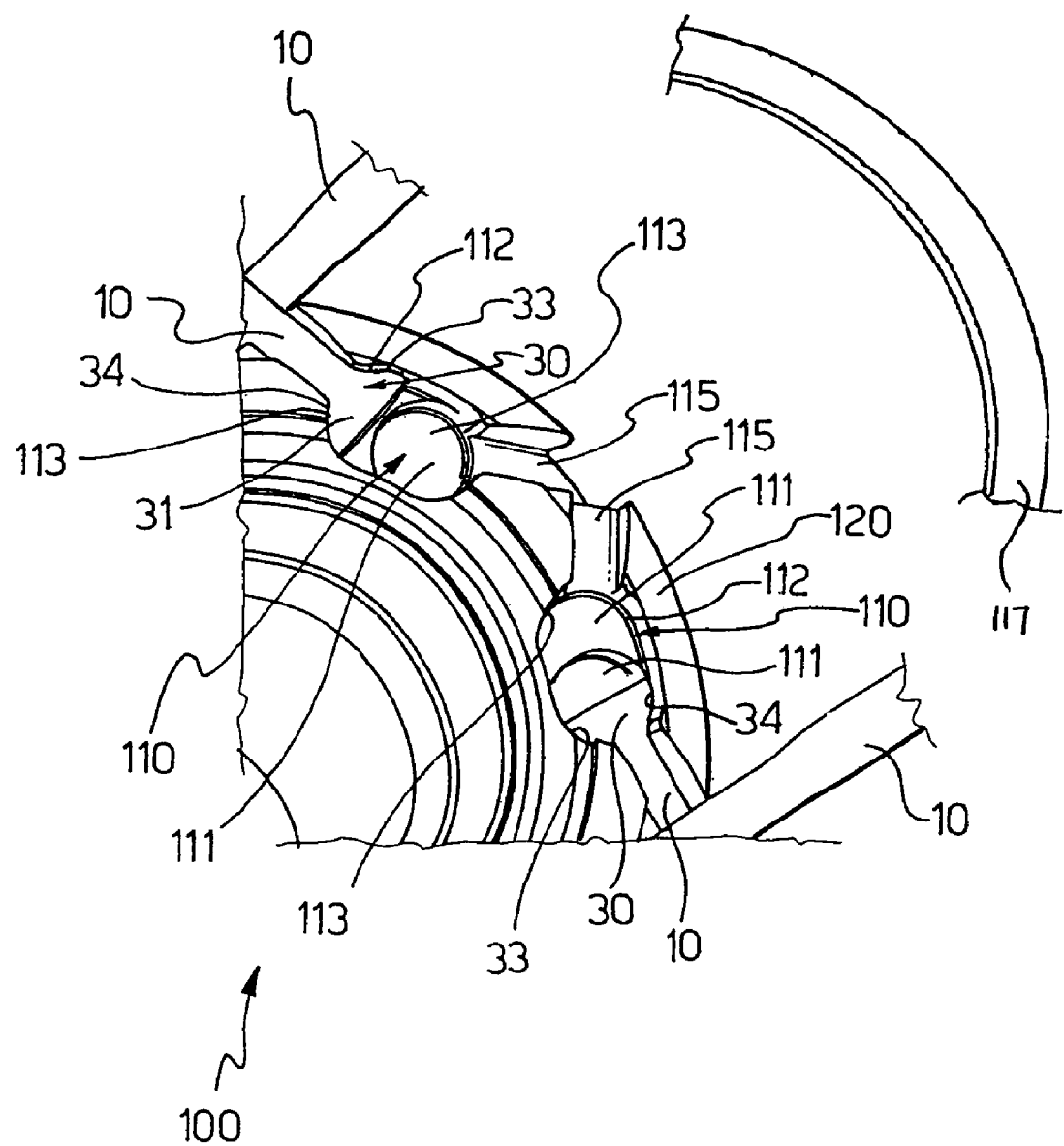
FIG. 6 is an enlarged schematic section view of a portion of hub of the wheel of the present invention.
Figure 7:
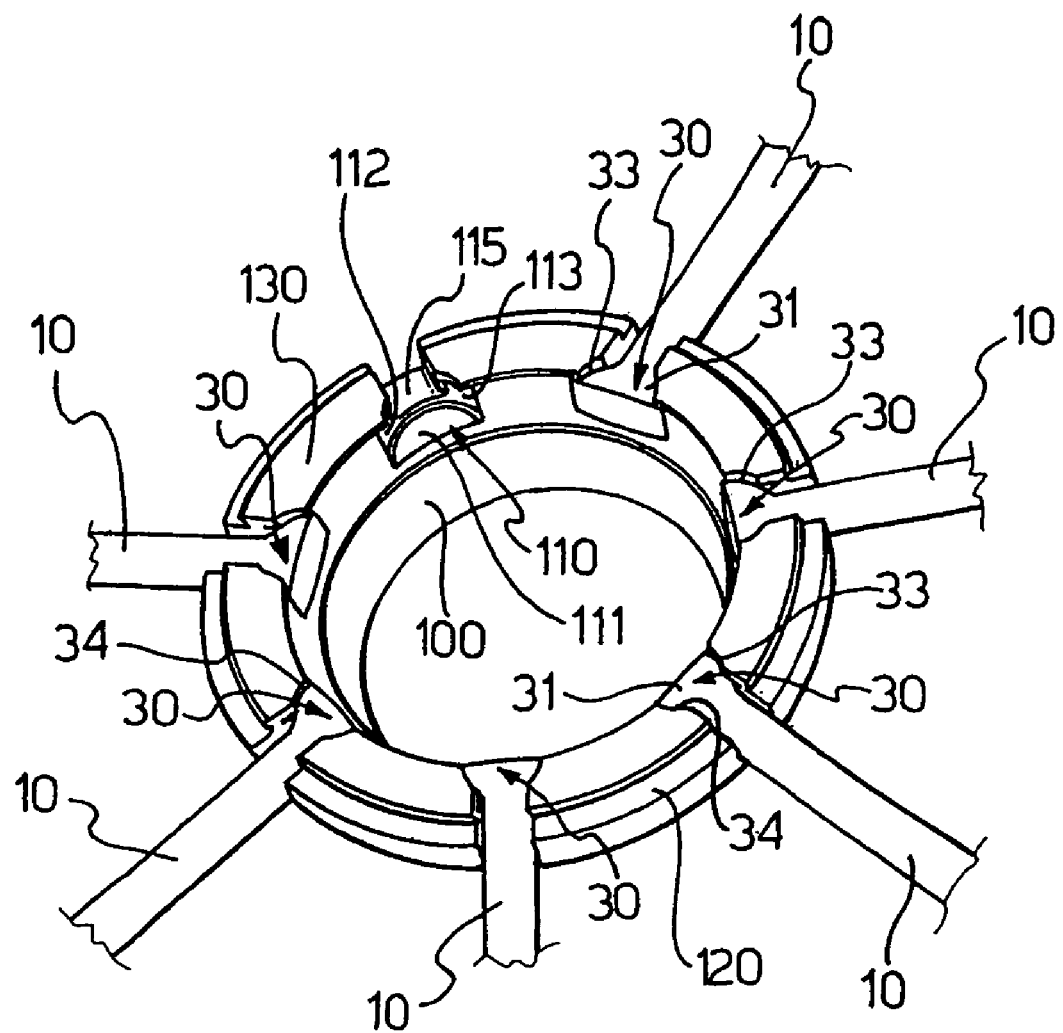
FIG. 7 is a schematic perspective view of a central portion of the wheel of the present invention in a second embodiment thereof.

The head 30 for the attachment to the hub also comprises, along the longitudinal axis X-X, a pair of substantially cylindrical side surface portions 33, 34 arranged symmetrically with respect to the longitudinal axis X-X; each of such opposite surfaces defines a side and axial abutment surface of the head 30 on the hub 100 of the bicycle wheel when the spoke 10 is mounted on the hub, as shall be better described hereafter with reference to FIGS. 5-7.

The hub 100 comprises a plurality of seats 110 formed on a front annular surface 120 thereof; each of the seats 110 is intended to receive the head 30 of a respective spoke 10 when it is mounted on the hub. In particular, each seat 110 comprises a substantially flat front surface 111. When the spoke 10 is mounted on the hub 100, the head 30 is housed in the seat 110 arranging the front surface 32 of the head 30 in abutment against the front surface 111 of the seat 110, as shown in FIGS. 5-7.

Advantageously, the provision of the substantially flat front surface 32 and the substantially flat front surface 111 provided in the hub, makes easier the assembly and the tensioning of the spoke of the present invention, preventing it from rotating about its axis, and contributes to achieving a stable connection of the spoke on the hub, avoiding that possible torsions of the spoke caused by collisions or vibrations could alter the desired characteristics of aerodynamics and aesthetics Each seat 110 also comprises a pair of side surface portions 112, 113 of a shape matching the side surface portions 33, 34 of the head 30 (FIG. 7); these portions, when the spoke 10 is mounted on the hub, are arranged in abutment against the side surfaces 112, 113 of the seat 110, as shown in FIGS. 5-7.

The provision in the spoke of the invention of substantially cylindrical portions for side surfaces portions 33, 34, and the corresponding side surface portions 112, 113 of matching shape provided in the hub, allows the self-alignment of the spoke during its assembly onto the rim, thanks to the small adjustment movements that are allowed by the relative sliding of the matching surfaces defined above.

The seats 110 also comprise a seat portion 115 intended to receive the body portion 20 immediately adjacent to the head 30.

In the embodiment of the wheel of the present invention illustrated in FIGS. 5 and 6, the seats 110 of the hub 100 are orientated according to an orientation substantially tangential to the front annular surface 120 of the hub; in particular, the seats 110 are alternatively formed on two different planes of said front surface 120 and orientated substantially tangentially in the opposite direction so as to achieve a wheel configuration with crossed spokes. In such an embodiment, the movement of the spokes in the direction of the axis of the hub outwards is prevented preferably by associating an annular counter element 117 (shown removed) with the hub at the front surface 120 of the hub, such a counter element 117 being suitable for operating in abutment against the spokes 10 at the zone in which they cross over.

In the embodiment of the wheel of the present invention illustrated in FIG. 7, the seats 100, and consequently the spokes 10, are orientated along a substantially radial orientation. Also in such an embodiment, the movement of the spokes in the direction of the axis of the hub outwards is prevented by associating an annular counter element 130 with the hub at the front surface 120 of the hub, such an element being suitable for operating in abutment against the front surfaces 31 of the heads 30 of the spokes 10.

The manufacturing of the spoke 10 of the present invention can be carried out starting from a wire of metallic material in an annealed state having a cross section of area equal to the area of the cross section of the desired head for attachment to the hub or from a wire of metallic material in an annealed state having a cross section of smaller area than the area of the cross section of the desired head for attachment to the hub, and in particular with a diameter equal to or smaller than that of the section of the desired head for attachment to the rim.

In the case in which the area of the starting section of the wire of metallic material is equal to that of the section of the desired head for attachment to the hub, one proceeds by firstly cutting a filament of predetermined length having a circular section from such a starting wire. Then the filament is shaped through plastic deformation, cold or hot (for example through hammering), to obtain cross sections (generally circular) of different areas between the head for attachment to the hub and the head for attachment to the rim. Optionally, an intermediate annealing heat treatment can be carried out to promote the reduction in hardness of the material and to increase its deformability.

One then proceeds with a step of pressing or squashing the filament by cold or hot plastic deformation in the various zones along the longitudinal axis of the filament to obtain the desired squashed profile. Such a squashing step can for example carried out by molding (using a suitably shaped mold and countermold) or by rolling (passing the filament through a pair of suitably shaped rollers). Also in this case, optionally, an intermediate annealing heat treatment can be carried out to promote the reduction in hardness of the material and to increase its deformability.

One then proceeds with the shaping of the head for attachment to the hub. Such a step comprises a squashing by molding of the head for attachment to the hub and can be carried out at the same time as the squashing step of the filament mentioned above.

Then the calibration of the length of the spoke is carried out through trimming or butting of the head for attachment to the hub.

The filament is then subjected to a drawing temper heat treatment to improve its mechanical characteristics.

One then proceeds with the threading of the head for attachment to the rim. Such a threading can be carried out by rolling or by chip-removal machining. In the case of threading by rolling, the operation requires that the profile of the thread is obtained by plastic deformation starting from a filament with a pre-processing diameter smaller than the diameter of the head for attachment to the rim. In the case of threading by shaving-removal, the operation requires that the profile of the thread is obtained by removal of material from a filament with a pre-processing diameter equal to (or possibly greater than) that of the head for attachment to the rim.

Finally, a surface protection treatment on the spoke or a portion thereof is carried out by anodization or by painting.

On the other hand, in the case in which the area of the starting section of the wire of metallic material is smaller than that of the section of the desired head for attachment to the hub, one proceeds by firstly cutting a filament of predetermined length having a circular section from a starting wire having a diameter equal to or greater than that of the desired head for attachment to the rim. The steps of the method for manufacturing the spoke are totally identical to those described above, with the sole difference that the shaping of the head for attachment to the hub is carried out in this case by upsetting; in particular, during such a step the section of the head is progressively increased through axial movement of the material until the desired section is obtained.

The manufacturing methods described above advantageously allow a spoke to be obtained having sections of different area along its length. In particular, such methods allow a spoke to be obtained with a small amount of material in its central zone, where the traction stresses are not amplified by local effects related to the attachment to the hub and/or to the rim. This advantageously allows the overall weight of the spoke of the present invention to be reduced with respect to known spokes, having cross sections of constant area for the entire length on which they extend.

What is claimed is:

1. A spoke for a bicycle wheel, comprising an elongated body of metallic material extending along a longitudinal axis X-X comprising:
    a first end portion for the attachment to a hub of a bicycle wheel;
    a second end portion for the attachment to a rim of a bicycle wheel;
    an intermediate portion between said first and second end portions, in which said intermediate portion comprises a flattened portion that is flattened in a transversal direction Z perpendicular to said longitudinal axis X-X and extending along said longitudinal axis X-X up to said first end portion;
    wherein said first end portion is flattened in said transversal direction Z and is gradually joined to said flattened portion along said longitudinal axis X-X;
    wherein said first end portion comprises, along said longitudinal axis X-X, a pair of substantially cylindrical opposite side surface portions defining side and axial abutment surfaces of said first end portion configured to engage a hub of a bicycle wheel.

2. The spoke of claim 1 wherein a thickness of said first end portion is greater than a thickness of said flattened portion in said transversal direction Z.

3. The spoke of claim 1 wherein the thickness of said first end portion is substantially the same as the thickness of said flattened portion in said transversal direction Z.

4. The spoke of claim 1 wherein the thickness of said first end portion is smaller than the thickness of said flattened portion in said transversal direction Z.

5. The spoke of claim 1 wherein said flattened portion comprises a zone adjacent to said first end portion and wherein said first end portion has a cross section having a profile that is substantially the same shape as the profile of the cross section of said zone adjacent to said first end portion.

6. The spoke of claim 1 wherein said second end portion is threaded and wherein said intermediate portion comprises a cylindrical portion extending along said longitudinal axis X-X and adjacent to said second end portion.

7. The spoke of claim 1 wherein said flattened portion of said intermediate portion has, along said longitudinal axis X-X, a plurality of cross sections of different area.

8. The spoke of claim 7 wherein said flattened portion has, from a midpoint thereof along said longitudinal axis X-X, cross sections of increasing area towards said zone adjacent to said first end portion and towards the cylindrical portion adjacent to said second end portion.

9. The spoke of claim 1 wherein said first end portion comprises at least one substantially flat front surface extending along said longitudinal axis X-X and defining a front abutment surface of said first end portion configured to engage a hub of a bicycle wheel.

10. The spoke of claim 9 wherein said at least one front surface extends along said longitudinal axis X-X for a length portion greater than the dimension of said first end portion in said transversal direction Z.

11. A bicycle wheel, comprising:
    a hub;
    a rim; and
    a plurality of spokes extending between said hub and said rim;
    wherein said plurality of spokes are of the type claimed in claim 1.

12. The bicycle wheel of claim 11 wherein said hub comprises a front annular surface on which a plurality of seats are formed for housing said first end portions of said spokes.

13. The bicycle wheel of claim 12 wherein each of said first end portions of spoke comprises at least one first substantially flat front surface extending along said longitudinal axis X-X and operating in abutment against a corresponding substantially flat front surface of a respective seat formed in the hub.

14. The bicycle wheel of claim 11 wherein each of said first end portions of spoke comprises a pair of substantially cylindrical opposite side surface portions which operate in abutment against corresponding opposite side surface portions of a respective seat formed in the hub, wherein said side surfaces of each of said seats have a shape corresponding to that of said side surfaces of said first end portions of spoke.

15. The bicycle wheel of claim 11 wherein said seats are formed on said front surface of the hub and have a substantially tangential orientation to said hub.

16. The bicycle wheel of claim 11 wherein said seats are formed on said front surface of the hub and have a substantially radial orientation to said hub.

17. A bicycle wheel spoke comprising:
    a first flattened end portion configured for attachment to a hub of a bicycle wheel;
    a second end portion configured for attachment to a rim of a bicycle wheel;
    an intermediate portion between said first and second end portions, in which said intermediate portion comprises a flattened portion;
    wherein said first end portion comprises a pair of substantially cylindrical opposite side surface portions defining side and axial abutment surfaces of said first end portion configured to engage a hub of a bicycle wheel.

18. The spoke of claim 17 wherein the cross sectional area of said first end portion is greater than the cross sectional area of said flattened portion.

19. The spoke of claim 17 wherein said flattened portion comprises a zone adjacent to said first end portion and wherein said first end portion has a cross section having a profile that is substantially the same shape as the profile of the cross section of said zone adjacent to said first end portion.

20. The spoke of claim 17 wherein said second end portion is threaded and wherein said intermediate portion comprises a cylindrical portion.

21. The spoke of claim 17 wherein said flattened portion of said intermediate portion has a plurality of cross sections of different area.

22. The spoke of claim 21 wherein said flattened portion has, from a midpoint thereof, cross sections of increasing area towards said zone adjacent to said first end portion and towards a cylindrical portion adjacent to said second end portion.

23. The spoke of claim 17 wherein said first end portion comprises at least one substantially flat front surface defining at least one front abutment surface of said first end portion configured to engage a hub of a bicycle wheel.

24. The spoke of claim 23 wherein said at least one front abutment surface extends along a longitudinal axis X-X for a length greater than the dimension of said first end portion in a transversal direction Z.

25. The spoke of claim 17 wherein the first end portion and the intermediate portion have substantially the same cross sectional shape.

26. A spoke for a bicycle wheel, comprising an elongated body of metallic material extending along a longitudinal axis X-X comprising:
 a first end portion for the attachment to a hub of a bicycle wheel;
 a second end portion for the attachment to a rim of a bicycle wheel; and
 an intermediate portion between said first and second end portions, in which said intermediate portion comprises a flattened portion that is flattened in a transversal direction Z perpendicular to said longitudinal axis X-X and extending along said longitudinal axis X-X up to said first end portion;
 wherein said first end portion is flattened in said transversal direction Z and is gradually joined to said flattened portion along said longitudinal axis X-X; and
 wherein said second end portion is threaded and wherein said intermediate portion comprises a cylindrical portion extending along said longitudinal axis X-X and adjacent to said second end portion.

\* \* \* \* \*